(12) United States Patent
Ott et al.

(10) Patent No.: US 8,808,872 B2
(45) Date of Patent: Aug. 19, 2014

(54) GERMANIUM-CONTAINING SOLDER, A COMPONENT COMPRISING A SOLDER AND A PROCESS FOR SOLDERING

(75) Inventors: Michael Ott, Muelheim an der Ruhr (DE); Sebastian Piegert, Berlin (DE); Peter Randelzhofer, Erlangen (DE); Robert Singer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/638,938

(22) PCT Filed: Apr. 6, 2011

(86) PCT No.: PCT/EP2011/055362
§ 371 (c)(1),
(2), (4) Date: Oct. 2, 2012

(87) PCT Pub. No.: WO2011/128239
PCT Pub. Date: Oct. 20, 2011

(65) Prior Publication Data
US 2013/0029179 A1    Jan. 31, 2013

(30) Foreign Application Priority Data
Apr. 12, 2010 (EP) .................................... 10003854

(51) Int. Cl.
*B32B 15/01* (2006.01)
*C22C 19/05* (2006.01)
*B23K 35/22* (2006.01)
*F01D 5/00* (2006.01)
*B23K 35/30* (2006.01)

(52) U.S. Cl.
CPC ......... *F01D 5/005* (2013.01); *F05C 2201/0466* (2013.01); *B23K 35/22* (2013.01); *F05C 2201/0463* (2013.01); *F05C 2201/025* (2013.01); *B23K 35/3033* (2013.01); *Y02T 50/67* (2013.01); *F05D 2300/131* (2013.01)
USPC .......... 428/680; 428/678; 420/442; 420/447; 420/448

(58) Field of Classification Search
USPC ........................................... 428/678; 420/448
See application file for complete search history.

(56) References Cited

U.S. PATENT DOCUMENTS

| | | | |
|---|---|---|---|
| 6,024,792 A | 2/2000 | Bieler et al. | |
| 2007/0175546 A1* | 8/2007 | Hoppe et al. | 148/428 |

FOREIGN PATENT DOCUMENTS

| | | |
|---|---|---|
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |

(Continued)

OTHER PUBLICATIONS

EPO Machine Translation of EP1764182.*

(Continued)

*Primary Examiner* — Gwendolyn Blackwell
*Assistant Examiner* — Lucas Wang

(57) ABSTRACT

A germanium containing nickel-based solder having a similar composition to a nickel-based superalloy is provided. As a result of which the proportion of γ' formed in the solder is reduced. The solder also includes chromium, cobalt, molybdenum, tungsten, aluminum, and titanium. A component including the solder is also provided.

18 Claims, 3 Drawing Sheets

(56) References Cited

FOREIGN PATENT DOCUMENTS

| | | | | |
|---|---|---|---|---|
| EP | 1764182 | * | 3/2007 | ............. B23K 35/30 |
| EP | 1970156 A1 | | 9/2008 | |
| WO | WO 9967435 A1 | | 12/1999 | |
| WO | WO 0044949 A1 | | 8/2000 | |

OTHER PUBLICATIONS

EPO Machine Translation of EP1970156.*

* cited by examiner

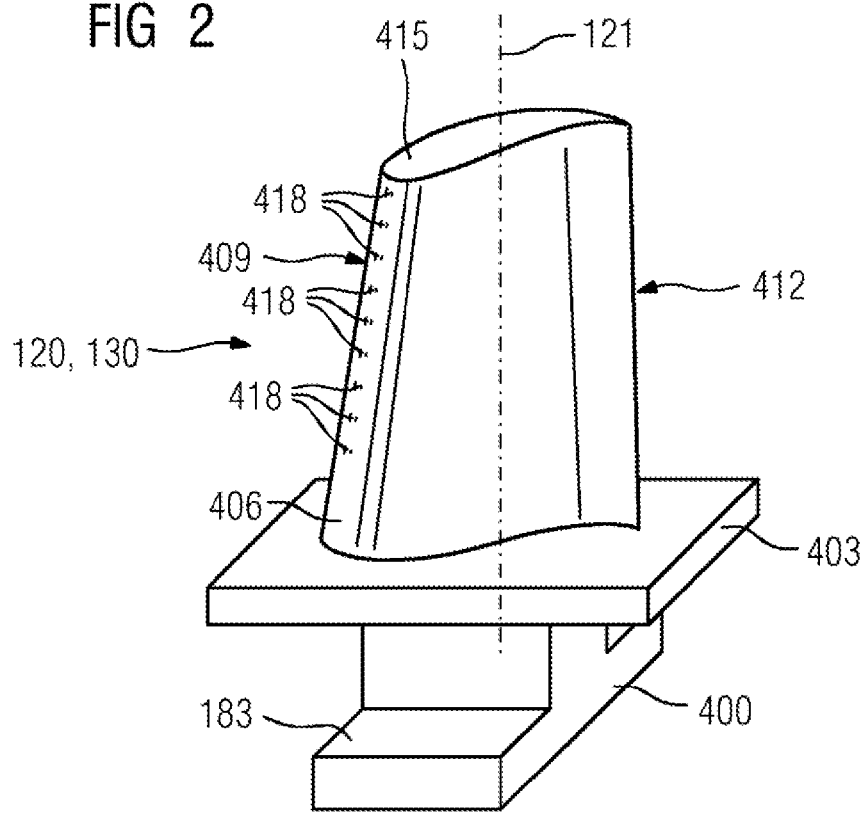
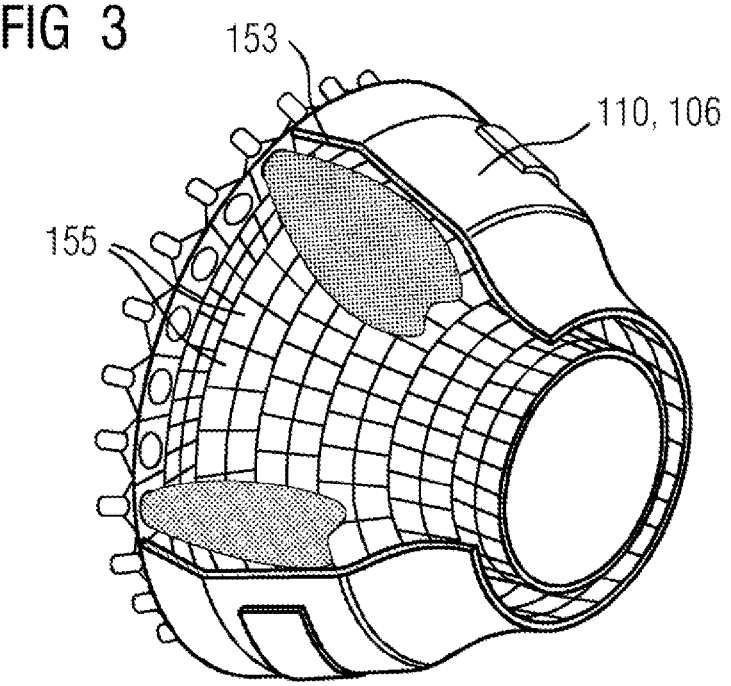

FIG 4

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf | |
| Ni-based investment casting alloys | | | | | | | | | | | | | | |
| GTD 222 | 0.10 | 22.5 | Rem. | 19.0 | | 2.0 | 1.0 | | 1.2 | 2.3 | 0.008 | | | |
| IN 939 | 0.15 | 22.4 | Rem. | 19.0 | | 2.0 | 1.4 | 1.0 | 1.9 | 3.7 | 0.009 | 0.10 | | |
| IN 6203 DS | 0.15 | 22.0 | Rem. | 19.0 | | 2.0 | 1.1 | 0.8 | 2.3 | 3.5 | 0.010 | 0.10 | 0.75 | |
| Udimet 500 | 0.10 | 18.0 | Rem. | 18.5 | 4.0 | | | | 2.9 | 2.9 | 0.006 | 0.05 | | |
| IN 738 LC | 0.10 | 16.0 | Rem. | 8.5 | 1.7 | 2.6 | 1.7 | 0.9 | 3.4 | 3.4 | 0.010 | 0.10 | | |
| SC 16 | <0.01 | 16.0 | Rem. | | 3.0 | | 3.5 | | 3.5 | 3.5 | <0.005 | <0.008 | | |
| Rene 80 | 0.17 | 14.0 | Rem. | 9.5 | 4.0 | 4.0 | | | 3.0 | 5.0 | 0.015 | 0.03 | | |
| GTD 111 | 0.10 | 14.0 | Rem. | 9.5 | 1.5 | 3.8 | 2.8 | | 3.0 | 4.9 | 0.012 | 0.03 | | |
| GTD 111 DS | | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 | |
| IN 792 DS | 0.08 | 12.5 | Rem. | 9.0 | 1.9 | 4.1 | 4.1 | | 3.4 | 3.8 | 0.015 | 0.02 | 1.50 | |
| MAR M 002 | 0.15 | 9.0 | Rem. | 10.0 | | 10.0 | 2.5 | | 5.5 | 1.5 | 0.015 | 0.05 | 1.40 | |
| MAR M 247 LC DS | 0.07 | 8.1 | Rem. | 9.2 | 0.5 | 9.5 | 3.2 | | 5.6 | 0.7 | 0.015 | 0.02 | | |
| CMSX-2 | <.006 | 8.0 | Rem. | 4.6 | 0.6 | 8.0 | 6.0 | | 5.6 | 1.0 | <.003 | <.0075 | 0.10 | |
| CMSX-3 | <.006 | 8.0 | Rem. | 4.6 | 0.6 | 8.0 | 6.0 | | 5.6 | 1.0 | <.003 | <.0075 | 0.10 | |
| CMSX-4 | | 6.0 | Rem. | 10.0 | 0.6 | 6.0 | 6.0 | | 5.6 | 1.0 | | Re=3.0 | | |
| CMSX-6 | <.015 | 10.0 | Rem. | 5.0 | 3.0 | <.10 | 2.0 | <.10 | 4.9 | 4.8 | <.003 | <.0075 | 0.10 | |
| PWA 1480 SX | <.006 | 10.0 | Rem. | 5.0 | | 4.0 | 12.0 | | 5.0 | 1.5 | <.0075 | <.0075 | | |
| PWA 1483 SX | 0.07 | 12.2 | Rem. | 9.0 | 1.9 | 3.8 | 5.0 | | 3.6 | 4.2 | 0.0001 | 0.002 | | |
| Co-based investment casting alloys | | | | | | | | | | | | | | |
| FSX 414 | 0.25 | 29.0 | 10 | Rem. | | 7.5 | | | | | 0.010 | | | |
| X 45 | 0.25 | 25.0 | 10 | Rem. | | 8.0 | | | | | 0.010 | | | |
| ECY 768 | 0.65 | 24.0 | 10 | 51.7 | | 7.5 | 4.0 | | 0.25 | 0.3 | 0.010 | 0.05 | | |
| MAR M-509 | 0.65 | 24.5 | 11 | Rem. | | 7.5 | 4 | | | 0.3 | 0.010 | 0.60 | | |
| CM 247 | 0.07 | 8.3 | Rem. | 10.0 | 0.5 | 9.5 | 3.2 | | 5.5 | 0.7 | | | 1.5 | |

GERMANIUM-CONTAINING SOLDER, A COMPONENT COMPRISING A SOLDER AND A PROCESS FOR SOLDERING

CROSS REFERENCE TO RELATED APPLICATIONS

This application is the US National Stage of International Application No. PCT/EP2011/055362, filed Apr. 6, 2011 and claims the benefit thereof. The International Application claims the benefits of European Patent Office application No. 10003854.6 EP filed Apr. 12, 2010. All of the applications are incorporated by reference herein in their entirety.

FIELD OF INVENTION

The invention relates to a germanium-containing solder, to a component comprising a solder and to a process for soldering.

BACKGROUND OF INVENTION

The prior art is formed by boron-containing and/or silicon-containing solders, but during soldering these precipitate hard base material phases, such as borides and silicides, in soldered seams. This has the effect that the mechanical properties are adversely affected by the hard phases.

SUMMARY OF INVENTION

In addition, the elements scandium and/or zirconium are also known as melting-point reducers, the greatest disadvantage of these being the high oxygen affinity, which demands high qualities of the soldering atmosphere.

It is therefore an object of the invention to develop an improved solder for high-temperature applications.

The object is achieved by a nickel-based solder as claimed in the claims, by a component as claimed in claim 5 and by a process as claimed in the claims.

The dependent claims list further advantageous measures which can be combined with one another as desired in order to achieve further advantages.

Considerably reduced proportions of low-melting eutectics are formed owing to the use of germanium.

The particular advantage of germanium is that it represents a γ' former and does not form any brittle phases.

Isothermal soldering becomes quicker with germanium, since germanium dissolves in the matrix and thus diffuses quicker.

In part, germanium replaces Al+Ti, which are affine to oxygen, such that the oxide formation is reduced by germanium.

In particular, it is possible to solder titanium-containing superalloys with this solder alloy, in particular PWA1483.

Not only nickel-based superalloys but also cobalt-based base alloys can be soldered with the alloy.

BRIEF DESCRIPTION OF THE DRAWINGS

In the figures:
FIG. 2 shows a turbine blade or vane,
FIG. 3 shows a combustion chamber,
FIG. 4 shows a list of superalloys.

DETAILED DESCRIPTION OF INVENTION

Figure 1:
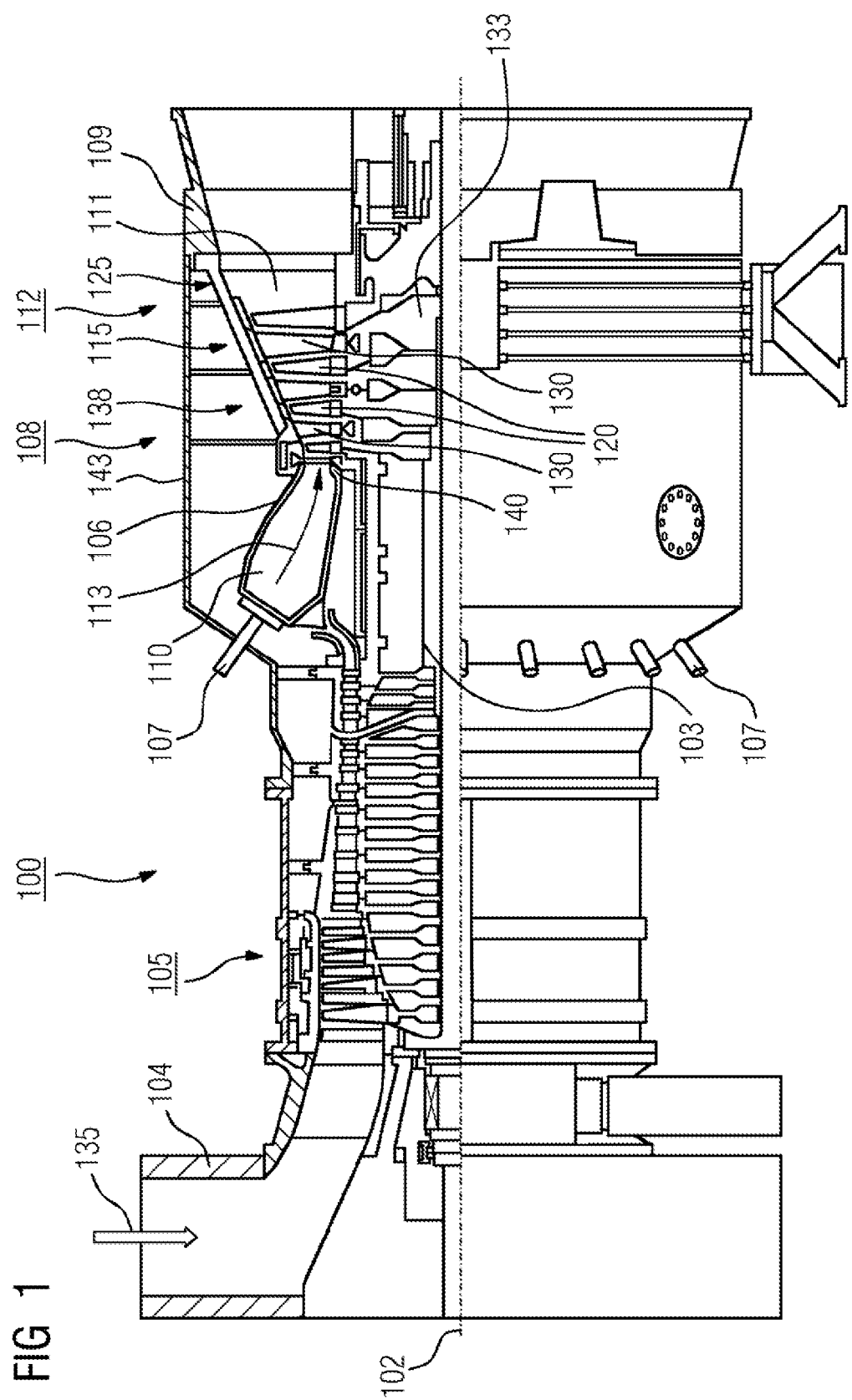
FIG. 1 shows a gas turbine.

The description and the figures represent merely exemplary embodiments of the invention.

The component which is soldered using the germanium-containing solder comprises a nickel-based or cobalt-based superalloy material as listed in FIG. 4. The substrate is preferably directionally solidified, i.e. comprises columnar grains, or has a single-crystal form.

Soldering temperatures of between 1080° C. and 1240° C. can be set with the solder. The process can be carried out isothermally or with a temperature gradient. Depending on parameters of the heat treatment, the solder can be directionally solidified or non-directionally solidified.

The nickel-based solder comprises, in an inconclusive list, the following elements (in % by weight):
10% to 25% germanium (Ge),
in particular 15% to 20% germanium (Ge),
10.5% to 12.6% chromium (Cr),
in particular 11.2% to 11.9% chromium (Cr),
7.1% to 8.6% cobalt (Co),
in particular 7.6% to 8.1% cobalt (Co),
3% to 3.6% molybdenum (Mo),
in particular 3.2% to 3.4% molybdenum (Mo),
3% to 3.6% tungsten (W),
in particular 3.2% to 3.4% tungsten (W),
2.2% to 2.7% aluminum (Al),
in particular 2.4% to 2.6% aluminum (Al),
and 3.6% to 4.5% titanium (Ti),
in particular 4.0% to 4.5% titanium (Ti),
nickel (Ni).

With preference, this list is conclusive.

With preference, Rene 80 or PWA1483 can be repaired in this solder.

Depending on the substrate and site of damage and later operating temperature, the solder can be directionally solidified or non-directionally solidified.

This is preferably effected by an isothermal process.

The alloy preferably does not constitute a mixture of various powders, but rather is an alloy comprising the elements listed.

FIG. 1 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.75Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer.

Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

FIG. 3 shows a combustion chamber 110 of the gas turbine 100. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sandblasting). Then, the corrosion and/or oxidation layers and products are removed.

If appropriate, cracks in the turbine blade or vane, 120, 130, or the heat shield element 155 are also repaired. This is followed by recoating of the turbine blades or vanes 120 130 or heat shield elements 155, after which the turbine blades or vanes 120, 130 or the heat shield elements 155 can be reused.

The invention claimed is:

1. A nickel-based solder, comprising (in % by weight):
10% to 25% germanium;
11.2% to 11.9% chromium;
7.1% to 8.6% cobalt;
3% to 3.6% molybdenum;
3% to 3.6% tungsten;
2.2% to 2.7% aluminum;
3.6% to 4.5% titanium; and
balance nickel.

2. The solder as claimed in claim 1, consisting of the elements nickel, germanium, chromium, cobalt, molybdenum, tungsten, aluminum, and titanium.

3. The solder as claimed in claim 1, wherein the solder constitutes an alloy including all of the alloy elements indicated.

4. The solder as claimed in claim 1, comprising no boron, and/or no silicon, and/or no copper, and/or no zirconium, and/or no scandium.

5. The solder as claimed in claim 1, wherein the solder comprises 15% to 20% (in % by wt.) germanium.

6. The solder as claimed in claim 1, wherein the solder comprises 7.6% to 8.1% (in % by wt.) cobalt.

7. The solder as claimed in claim 1, wherein the solder comprises 3.2% to 3.4% (in % by wt.) molybdenum.

8. The solder as claimed in claim 1, wherein the solder comprises 3.2% to 3.4% (in % by wt.) tungsten.

9. A component, comprising:
a solder as claimed in claim 1.

10. The component as claimed in claim 9, further comprising a nickel-based superalloy substrate.

11. The component as claimed in claim 9, further comprising a cobalt-based superalloy substrate.

12. The component as claimed in claim 10, further comprising Rene 80 or IN 738 as the substrate.

13. The component as claimed in claim 10, further comprising PWA 1483 as the substrate material.

14. The component as claimed in claim 9, wherein a substrate includes a directionally solidified structure.

15. The component as claimed in claim 9, wherein a substrate does not have a directionally solidified structure.

16. The component as claimed in claim 9, wherein the solder does not have a directionally solidified structure.

17. The component as claimed in claim 10, wherein the solder has a directionally solidified structure.

18. A process for soldering a component, comprising:
contacting a solder as claimed in claim 1 with the component; and
carrying out the soldering isothermally for a single crystal component.

* * * * *